United States Patent
Dona et al.

(10) Patent No.: US 7,125,505 B1
(45) Date of Patent: Oct. 24, 2006

(54) METHOD OF MANUFACTURING A MOLD FOR USE IN THE MANUFACTURE OF AN OPTICAL ELEMENT COMPRISING OPTICAL SUB-ELEMENTS MUTUALLY ARRANGED IN A PATTERN, AND DEVICE FOR IMPLEMENTING SUCH A METHOD

(75) Inventors: Marinus J. J. Dona, Eindhoven (NL); Johannes M. M. Swinkels, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 972 days.

(21) Appl. No.: 08/525,045

(22) Filed: Sep. 8, 1995

(30) Foreign Application Priority Data

Sep. 9, 1994 (EP) .................................. 94202597

(51) Int. Cl.
*B29D 11/00* (2006.01)

(52) U.S. Cl. ....................... 264/2.5; 425/808
(58) Field of Classification Search ................ 264/2.5; 359/741, 619; 29/90.1; 164/46, 271; 65/64; 64/286; 425/808; 72/76, 367

See application file for complete search history.

(56) References Cited

U.S. PATENT DOCUMENTS

| | | | | |
|---|---|---|---|---|
| 3,288,045 A | * | 11/1966 | Harding ...................... 355/18 |
| 3,526,949 A | * | 9/1970 | Genovese .................... 350/417 |
| 4,960,326 A | * | 10/1990 | Dauvergne .................... 351/41 |
| 5,151,790 A | * | 9/1992 | Takatori et al. ............. 348/335 |
| 5,155,144 A | * | 10/1992 | Manganaro et al. ......... 523/134 |
| 5,225,935 A | * | 7/1993 | Watanabe et al. ........... 359/619 |
| 5,319,007 A | * | 6/1994 | Bright ........................ 523/516 |
| 5,439,621 A | * | 8/1995 | Hoopman .................... 264/2.5 |
| 5,519,539 A | * | 5/1996 | Hoopman et al. .......... 359/741 |
| 5,723,517 A | * | 3/1998 | Campo et al. .............. 523/303 |
| 5,932,055 A | * | 8/1999 | Newell et al. .............. 156/245 |

FOREIGN PATENT DOCUMENTS

| | | | |
|---|---|---|---|
| EP | 0 294 867 | * | 5/1988 |
| EP | 0294867 | | 12/1988 |
| EP | 0574269 | | 12/1993 |
| JP | 58171021 | | 10/1983 |
| JP | 1257901 | | 10/1989 |
| WO | 9409974 | | 5/1994 |

* cited by examiner

*Primary Examiner*—David Ometz
*Assistant Examiner*—Justin Misleh

(57) ABSTRACT

A mold of ductile metal has a shape comprising consecutive sub-shapes corresponding to respective optical sub-elements having substantially identical shapes arranged in a pattern. The mold is shaped by means of a die having a die surface corresponding to the sub-shape, which sub-shape is imprinted in the ductile metal with a predetermined force one at a time in consecutive positions in accordance with the pattern, each position corresponding to a single optical sub-element.

14 Claims, 13 Drawing Sheets

Figure 1:
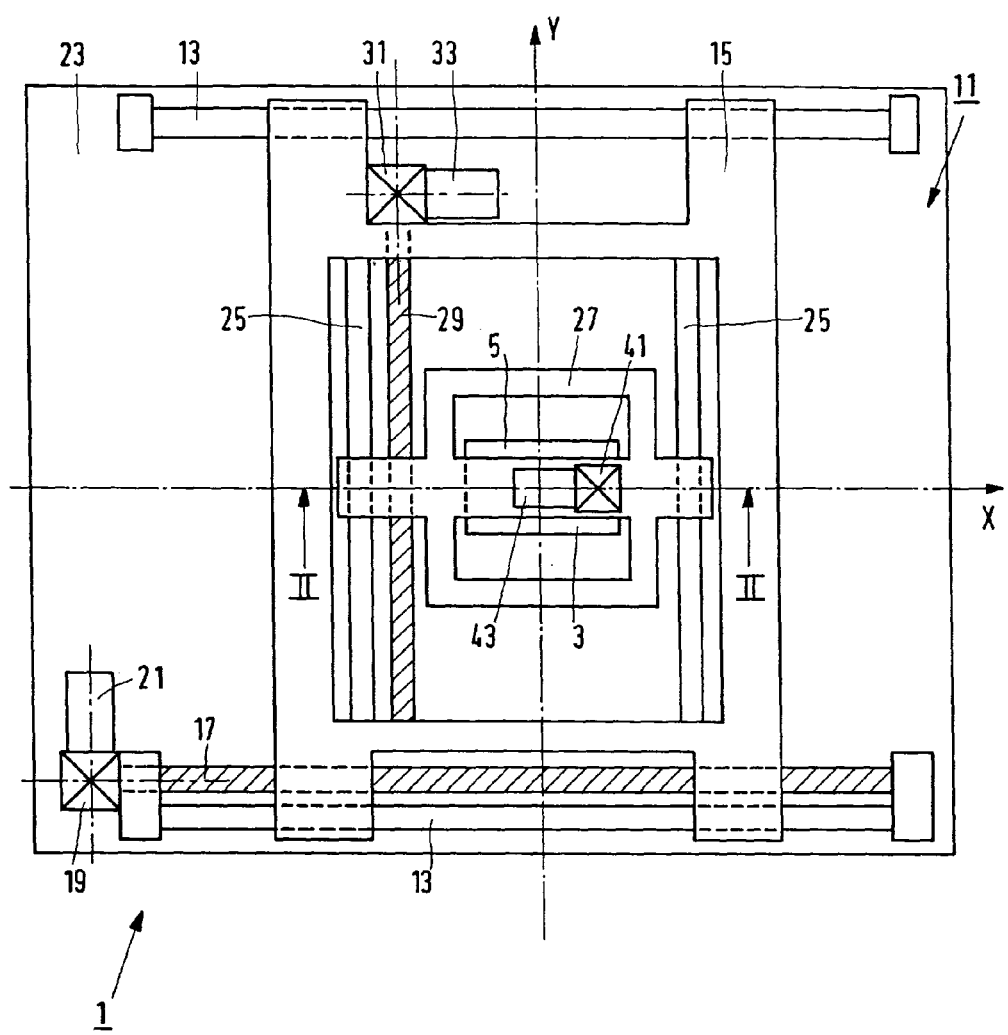

METHOD OF MANUFACTURING A MOLD FOR USE IN THE MANUFACTURE OF AN OPTICAL ELEMENT COMPRISING OPTICAL SUB-ELEMENTS MUTUALLY ARRANGED IN A PATTERN, AND DEVICE FOR IMPLEMENTING SUCH A METHOD

FIELD OF THE INVENTION

The invention relates to a method of manufacturing a mold for use in the manufacture of an optical element provided with mutually adjoining optical sub-elements arranged relative to one another in accordance with a pattern, by which method the mold is given a mold shape which corresponds to the pattern of sub-elements.

The invention also relates to a method of manufacturing an optical element provided with mutually adjoining optical sub-elements arranged relative to one another in accordance with a pattern, by which method a mold is given a mould shape which corresponds to the pattern of sub-elements and the optical element is manufactured with said mold by a replication technique.

The invention also relates to a device for implementing a method according to the invention.

The invention further relates to a die holder suitable for use in a device for implementing a method according to the invention.

The invention also relates to a liquid crystal display panel provided with an optical element manufactured by a method according to the invention.

The invention further relates to a picture display device provided with an optical element manufactured by a method according to the invention.

The invention also relates to a flat panel display device provided with an optical element manufactured by a method according to the invention.

The invention also relates to a solid state image sensor device provided with an optical element manufactured by a method according to the invention.

The invention also relates to a camera provided with an optical element manufactured by a method according to the invention.

The invention further relates to a method of manufacturing a front panel for a color picture tube, in which method an optical element is used which was manufactured by a method according to the invention.

The invention also relates to a device for the manufacture of a front panel for a color picture tube, which device is provided with an optical element manufactured by a method according to the invention.

BACKGROUND OF THE INVENTION

A method of manufacturing a mould and a method of manufacturing an optical element as mentioned in the opening paragraphs are known from JP-A-58-171021. The optical element to be manufactured by the known methods is a so-called lens array, which comprises a two-dimensional array of spherical lenses. According to the known methods, a die corresponding to the lens array is manufactured by joining together a number of sub-dies corresponding to the number of lenses of the lens array, each having a spherical die surface corresponding to a lens of the lens array, in the pattern of the lens array. The die is then pressed into a mold made from a clay-type ceramic material by means of a press, so that the mold is given a mould shape corresponding to the lens array, and the clay-type ceramic material of the mould is hardened in a heat treatment. Then a molten synthetic material is poured into the mold, put under pressure, and cooled down, so that a synthetic-resin lens array is formed which corresponds to the mold shape.

A disadvantage of the known methods is that the manufacture of the die used in the known methods is complicated and time-consuming because each sub-die of the die must be individually provided with a die surface corresponding to a lens of the lens array in an accurate manner. The known methods for this reason are particularly unsuitable for the manufacture of so-called microlens arrays which comprise a comparatively large number of microlenses of 1 mm, or even 0.1 mm diameter or smaller. In addition, no sharp boundaries between adjoining sub-moulds corresponding to individual lenses of the lens array arise in the mould because the clay-type ceramic material cannot fully penetrate the interstices between the sub-dies when the die is being pressed into the mould. As a result, the individual lenses of the lens arrays manufactured by means of the known mould merge fluently into one another, and the optically useful surface area of the lens array is limited by unsharp boundaries between the lenses of the lens array.

It is an object of the invention to provide a method of manufacturing a mould and a method of manufacturing an optical element of the kind as mentioned in the opening paragraphs wherein the disadvantages of the known methods mentioned above are avoided as much as possible, so that the mould and the optical element are manufactured in a manner which is less complicated and less time-consuming, while the optical elements manufactured by the methods have comparatively large optically useful surface areas.

According to the invention, the method of manufacturing a mold and the method of manufacturing an optical element are for this purpose characterized in that the mould is manufactured from a ductile metal and is given the mould shape by means of a die which is provided with a die surface corresponding to a shape of the optical sub-element and which is imprinted in the mold with a predetermined force in consecutive positions in accordance with the pattern. Said die is imprinted in the mould in consecutive positions in accordance with the pattern, i.e. a number of times which corresponds to the number of sub-elements of the optical element. This means that a die surface corresponding to the optical sub-element need be made only once in an accurate manner in the manufacture of the die. Since the time required for making a replica of the die in the mould is very short compared with the time necessary for making a die surface corresponding to the optical sub-element, the methods according to the invention can be implemented in a comparatively short time. The die required has a comparatively simple construction and can be positioned relative to the mould in the consecutive positions in accordance with said pattern by means of a positioning device which is usual and known per se. Since the die is imprinted in the mould with a predetermined force each time, the consecutive sub-shapes of the mould shape corresponding to the individual optical sub-elements have substantially identical shapes. It is achieved through a suitable choice of the force with which the die is imprinted in the mould that the ductile metal of the mould is plastically deformed exclusively at the area of the contact surface between mould and die, while the deformation around the contact surface is negligibly small, so that a sub-shape already provided in the mould and corresponding to an optical sub-element is not deformed any more upon the formation of an adjoining sub-shape. Since the sub-shape is imprinted is imprinted in the mold one at a time in consecutive positions in accordance with the pattern, it is in addition achieved that the ductile metal adjoining the die surface is optimally deformed each time, so that sharp boundaries between the sub-shapes are formed. The mould thus manufactured accordingly has a particularly high dimensional accuracy, while the optical elements manufactured by means of the mould have a high dimensional accuracy and a comparatively large optically useful surface area.

A special embodiment of a method according to the invention is characterized in that the mould is given the mould shape by means of the die after the mould has been previously provided with a surface smoothness desired for the optical element. The ductile metal is plastically deformed during the manufacture of the mould shape, for which the die is imprinted in the mould each time with the predetermined force, but a surface smoothness of the ductile metal present before deformation is substantially maintained. If the mould is first provided with a surface smoothness of an optical quality desired for the optical element, and is subsequently given the mould shape by means of the die, the mould shape and the optical elements manufactured by means of the mould will have the desired surface smoothness.

A further embodiment of a method according to the invention is characterized in that the mould is immersed in a liquid bath during the application of the mould shape by means of the die. The immersion of the mould in a liquid bath prevents in a simple and effective manner that dust and dirt particles present in the air enter between the die and the mould and damage the mould shape to be manufactured by means of the die.

A yet further embodiment of a method according to the invention is characterized in that the ductile metal comprises copper, aluminium, or zinc. These metals are eminently suitable for use in the methods according to the invention thanks to their good deformability.

A particular embodiment of a method according to the invention is characterized in that the die is provided with a spherical die surface and is imprinted in the mould in accordance with a hexagonal pattern. The optical element manufactured by this embodiment of the method has a two-dimensional hexagonal matrix of spherical lenses which have a substantially unlimited optically useful surface area.

A further embodiment of a method according to the invention is characterized in that the die has a flat die surface and is imprinted in the mould in accordance with an orthogonal pattern, while the die is pivoted through predetermined angles about two mutually perpendicular pivot axes in the consecutive positions of the pattern, which axes intersect one another in a centre of the die surface. The optical element manufactured by this embodiment of the method is a so-called faceted lens which comprises a two-dimensional orthogonal matrix of facets, each facet of the faceted lens having a flat lens surface which has been pivoted relative to a reference plane of the faceted lens about two mutually perpendicular pivot axes which extend parallel to the reference plane. The angles through which the die is pivoted in the consecutive positions of the pattern are determined beforehand, so that faceted lenses whose corresponding facets have different pivot angles can be manufactured by means of this embodiment of the method.

A device for implementing a method according to the invention the device is provided with a workpiece holder for fastening the mould, a tool holder for fastening the die, and a positioning device, the tool holder being provided with a straight guide which is displaceable relative to the workpiece holder by means of the positioning device, and with a die holder which slides relative to the straight guide and which rests against a stop of the straight guide under the influence of a predetermined elastic pretensioning force. The die is placed in the consecutive positions relative to the mould in accordance with the pattern by means of the positioning device and imprinted in the mould. When the die is moved into a next position by the positioning device, the die holder rests against the stop, and is released from this stop and exerts a force on the die and the mould corresponding to the elastic pretensioning force when the die is imprinted in the mould by means of the positioning device. The elastic pretensioning force is provided, for example, by a mechanical spring. It is achieved through a suitable choice of the elasticity modulus of the mechanical spring that the force with which the die is imprinted in the mould is substantially independent of the position occupied by the die holder in a direction parallel to the imprinting direction. This force thus has an accurately defined value, so that the mould shape is achieved in an accurate manner.

A special embodiment of a device for implementing a method according to the invention, in which the die is pivoted through predetermined angles about two mutually perpendicular pivot axes in the consecutive positions of the patter, is characterized in that the die holder is provided with a first carrier which slides relative to the straight guide, a second carrier which is pivotable relative to a pivot guide of the first carrier, and a third carrier which is pivotable relative to a pivot guide of the second carrier, while the die can be fastened to the third carrier and the two mutually perpendicular pivot axes form virtual axes of the pivot guide of the first carrier and of the pivot guide of the second carrier, respectively. The use of the two pivot guides renders it possible to set the angles through which the die is pivoted about the two pivot axes independently. Two actuators which are usual and known per se, for example, may be used in the device for setting said angles.

A liquid crystal display panel in which the properties of the optical element used therein and manufactured by a method according to the invention are used to particularly good purpose is characterized in that the optical element is a microlens array, and the display panel is provided with a liquid crystal layer which comprises a pattern of picture display elements and which adjoins the microlens array at a side where the light is incident, while each optical sub-element of the microlens array corresponds to one of the picture display elements of the liquid crystal layer.

A picture display device in which the properties of the optical element used therein and manufactured by a method according to the invention are used to particularly good purpose is characterized in that the optical element is a microlens array, while the picture display unit is provided with, in that order, an optical radiation source, a beam-forming optical system, a picture display system with at least one picture display panel, a system of projection lenses, and a picture projection screen, the picture display panel being provided with the microlens array at a side which faces the radiation source.

A flat panel display device in which the properties of the optical element used therein and manufactured by a method according to the invention are used to particularly good effect is characterized in that the optical element is a microlens array, while the flat panel display device is provided with, in that order, an illumination system for supplying an illumination beam, a picture display panel with a defined pattern of picture display elements for modulating picture information to be displayed, the microlens array being arranged between the illumination system and the picture display panel and being provided with a pattern of optical sub-elements which corresponds to the pattern of picture display elements of the picture display panel. Such a flat panel display device (back-light display) provided with a microlens array which is known per se is known from, for example, the article "Developers Cultivate TFT LCDs Specifically for Notebook Computers" by Sakae Arai in Display Devices, Spring 1994, no. 9, pp. 14–17.

The picture display panel used in the above picture display device and flat panel display device is, for example, a liquid crystal display or LCD as mentioned above. Such display panels have a large number of picture display elements or pixels which are arranged in a two-dimensional array and are separately adjustable. The individual pixels each have an electronic adjustment element whereby the optically useful surface area of the pixels is limited. The microlens array, in which each optical sub-element of the microlens array corresponds to one of the pixels of the display panel, focuses the light incident on the display panel onto the optically useful surface area of each individual pixel. Since the microlens array manufactured by the method according to the invention has a comparatively large optically useful surface area, the light beam coming from the beam-forming optical system is substantially entirely focused into the optically useful portions of the individual pixels, so that the display device has a particularly high light output. It is noted that the display panel used in the display device may alternatively be, for example, a digital micro-mirrored device or DMD, which is known per se.

A solid state image sensor device in which the properties of the optical element used therein and manufactured by a method according to the invention are used to particularly good effect is characterized in that the optical element is a microlens array and the image sensor device comprises a semiconductor body which is provided at a surface with a charge coupled device and with a pattern of image sensor elements for converting radiation into electric charges and which adjoins the microlens array at a side where the radiation is incident, while each optical sub-element of the microlens array corresponds to an image sensor element of the semiconductor body.

A camera in which the properties of the optical element used therein and manufactured by a method according to the invention are used to particularly good effect is characterized in that the optical element is a microlens array, and the camera is provided with, in that order, an objective lens system and an image sensor system with at least one solid state image sensor device which is provided with the microlens array at a side which faces the objective lens system.

The solid state image sensor device used in the camera has a large number of image sensor elements which are arranged in a two-dimensional array. The optically useful surface area of the solid state image sensor device is limited by the presence of the charge coupled device or CCD by means of which the electric charges generated by the image sensor elements are transported. The microlens array, in which each optical sub-element of the microlens array corresponds to one of the image sensor elements of the image sensor device, focuses the light incident on the image sensor device onto the optically useful surface areas of the individual image sensor elements. Since the microlens array manufactured by the method according to the invention has a comparatively large optically useful surface area, the light originating from the objective lens system is focused substantially entirely onto the optically useful portions of the individual image sensor elements, so that the solid state image sensor device has a particularly high light sensitivity.

A method of manufacturing a front panel for a colour picture tube in which the properties of the optical element used therein and manufactured by a method according to the invention are used to particularly good effect is characterized in that an inside of the front panel is provided with a layer of photosensitive material, and in that the front panel is subsequently illuminated through a shadow mask positioned at the inside of the front panel by means of a point-shaped light source, while the optical element is positioned between the shadow mask and the light source.

A device for manufacturing a front panel for a colour picture tube in which the properties of the optical element used therein and manufactured by a method according to the invention are used to particularly good effect is characterized in that the device is provided with, in that order, a point-shaped light source, a first holder for the optical element, and a second holder for the front panel and for a shadow mask to be arranged at an inside of the front panel.

Illumination of the photosensitive material on the front panel by means of the point-shaped light source through the shadow mask and subsequent development of the illuminated material forms a so-called symmetrical black matrix on the inside of the front panel with openings in which a phosphor is deposited during subsequent manufacturing steps of the picture tube. The optical element used is a faceted lens which comprises a two-dimensional orthogonal array of facets. The use of the faceted lens achieves that the projections of the light source formed by the shadow mask on the front panel coincide with the meeting points of the electron beams which are formed on the front panel by the shadow mask in the colour picture tube designed for the front panel and shadow mask. Such a method of manufacturing front panels for colour picture tubes is known, for example, from EP-A-0 294 867. When the faceted lens used is manufactured by a method according to the invention, this lens will have a particularly small pitch between individual facets, so that also discontinuities in the faceted lens formed by the boundaries between individual facets are particularly small. A very even illumination of the front panel is achieved thanks to the comparatively small discontinuities.

Figure 2:
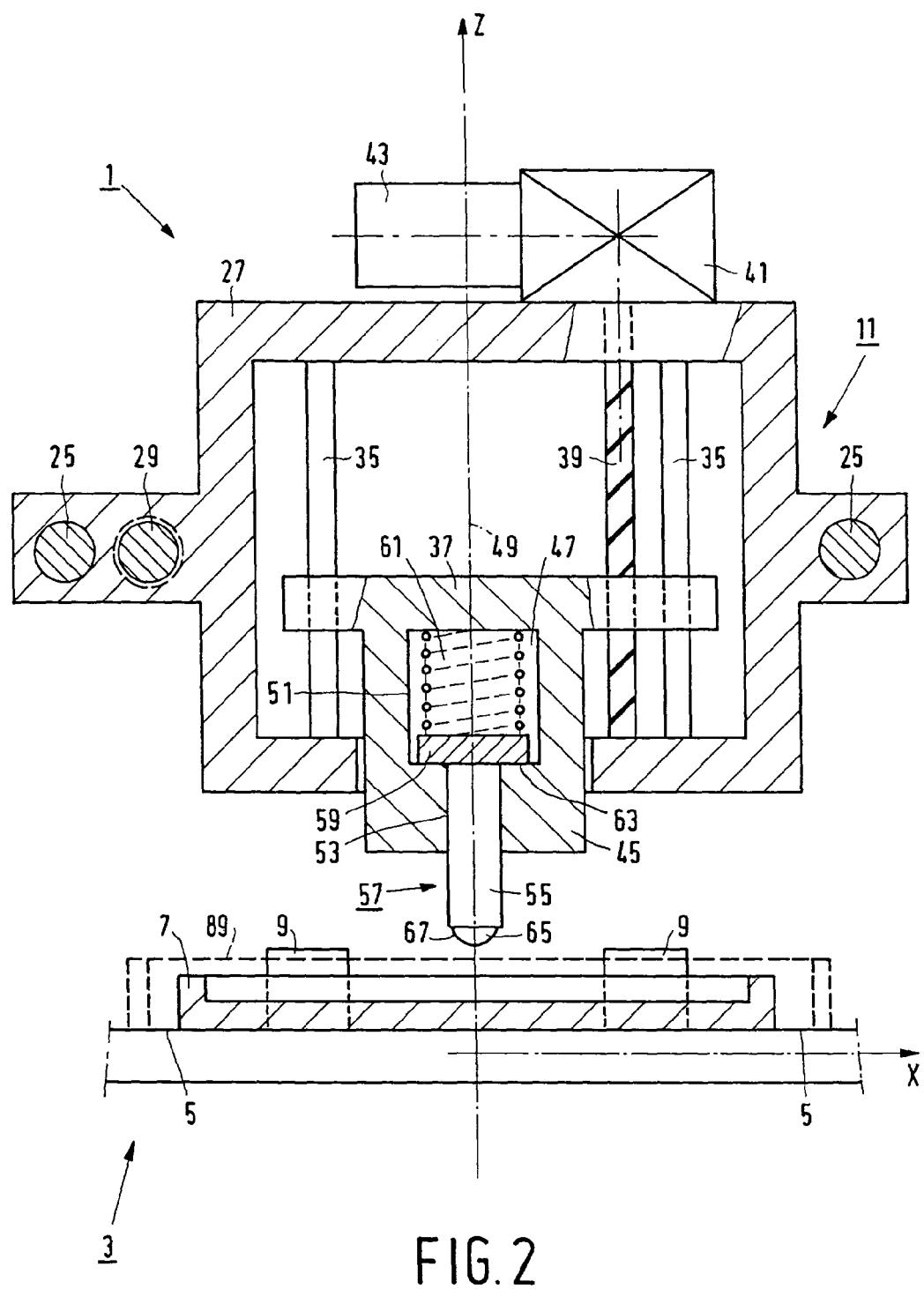
Figure 3:
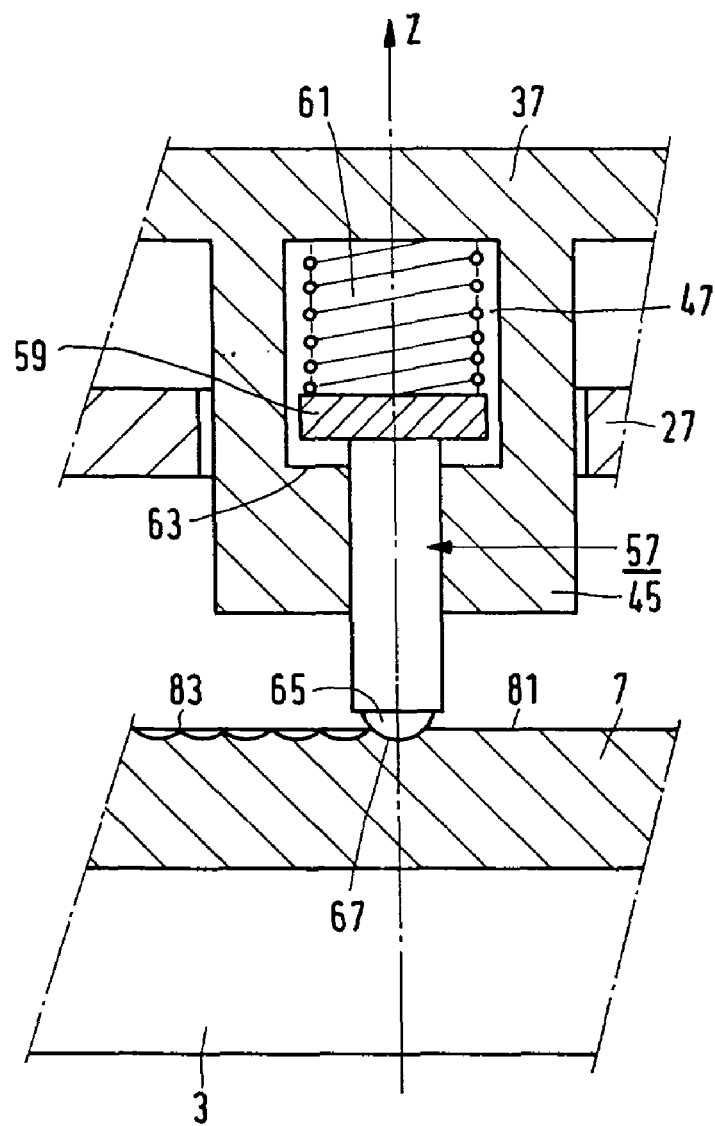
Figure 4A:
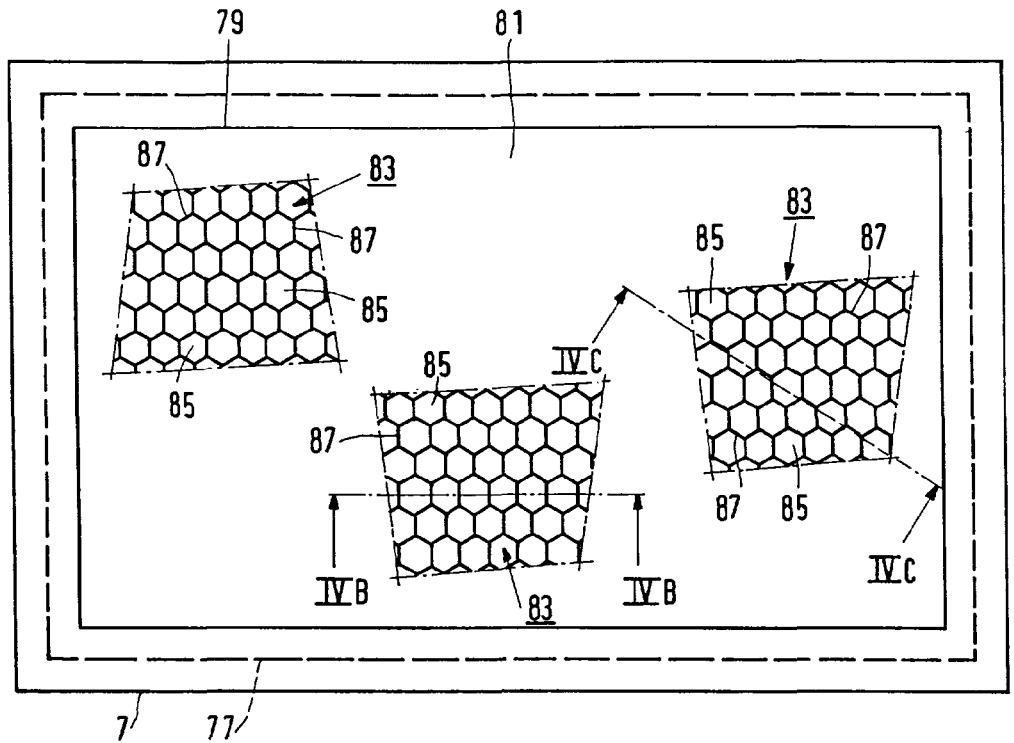
Figure 4B:
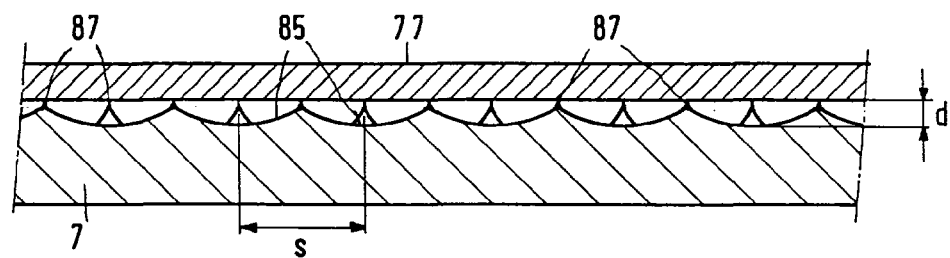
Figure 4C:
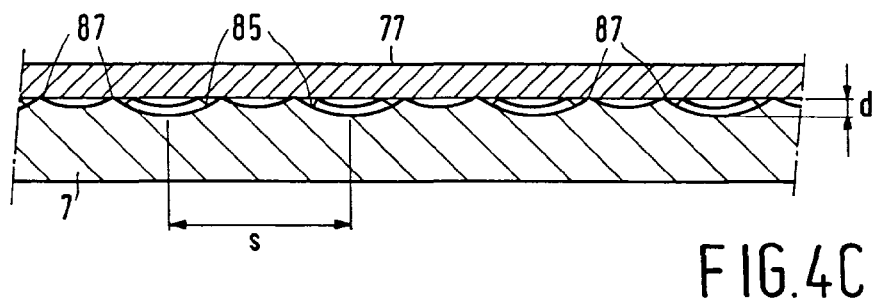
Figure 5A:
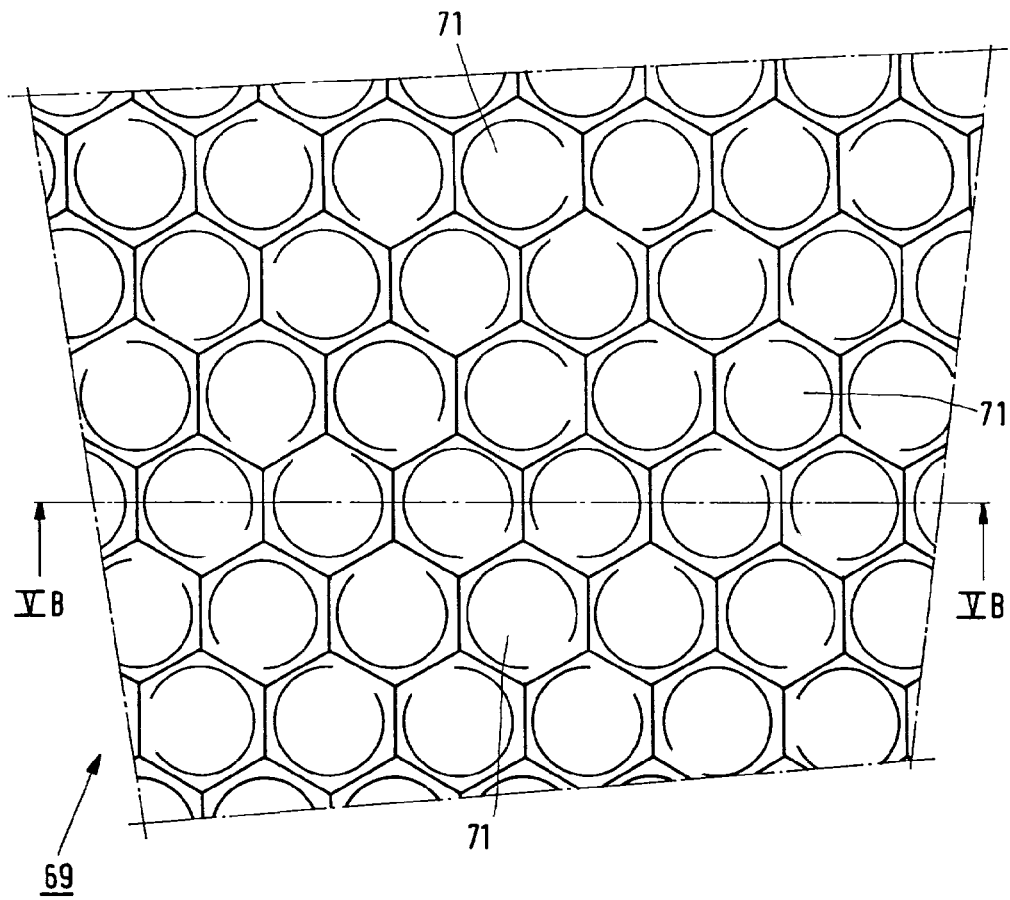
Figure 5B:
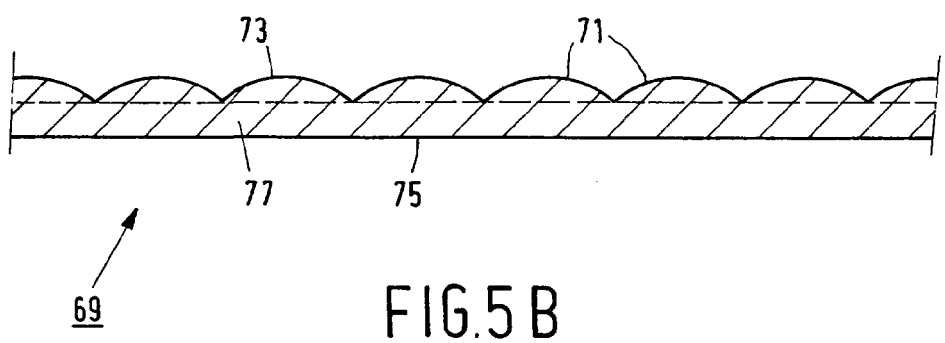
Figure 6:
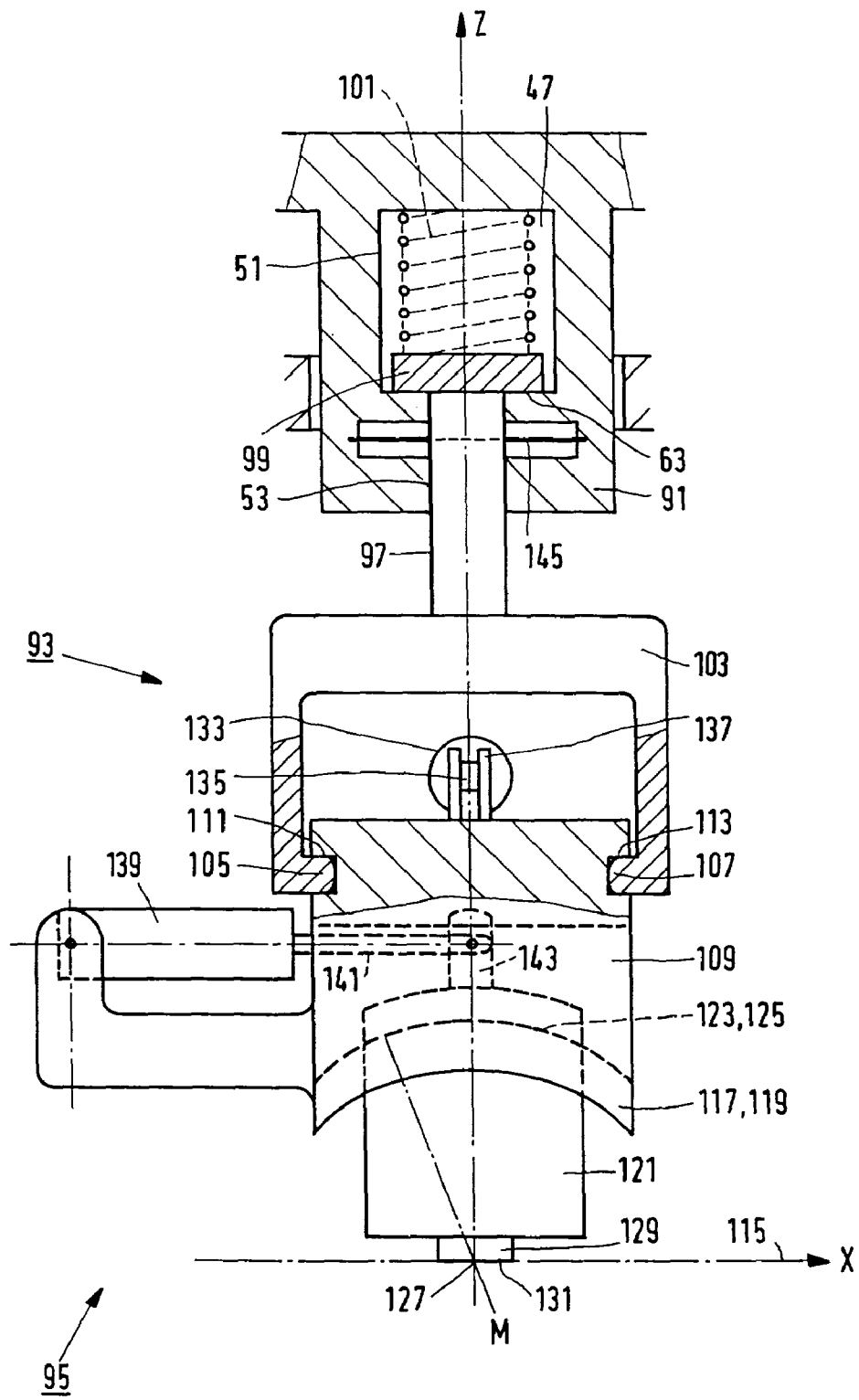
Figure 7:
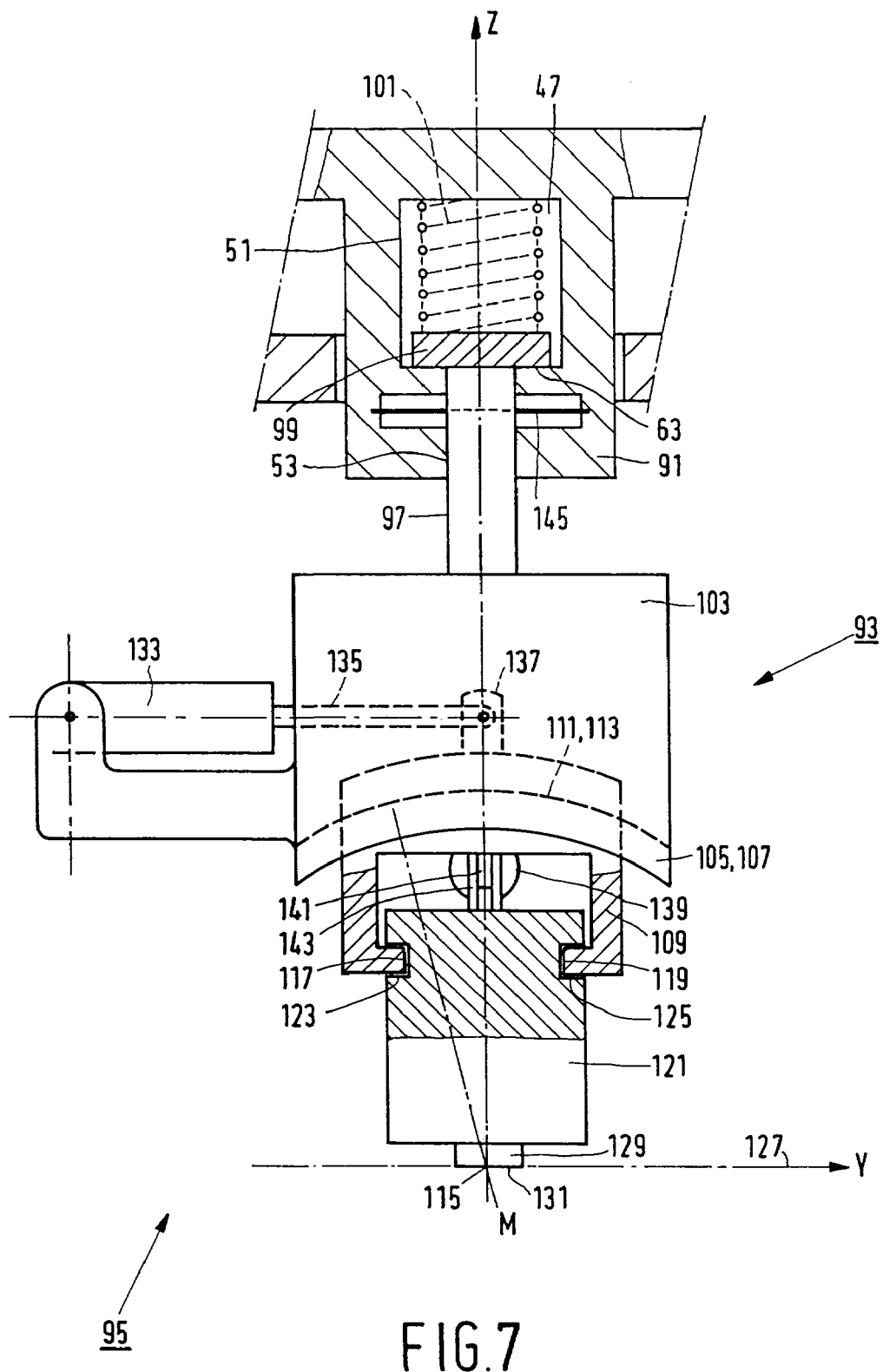
Figure 8A:
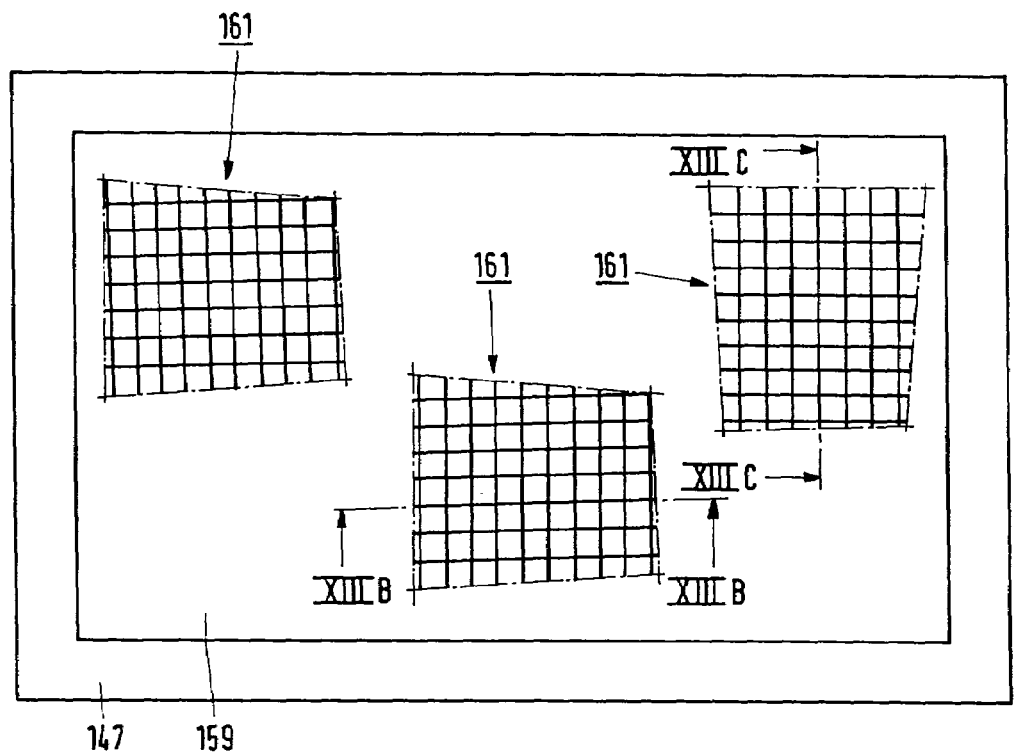
Figure 8B:
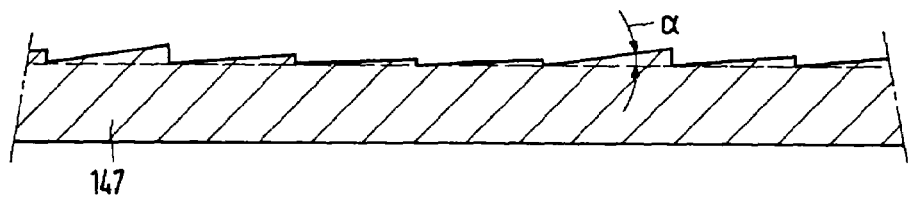
Figure 8C:
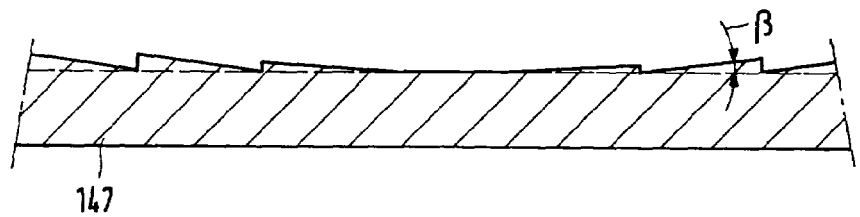
Figure 9A:
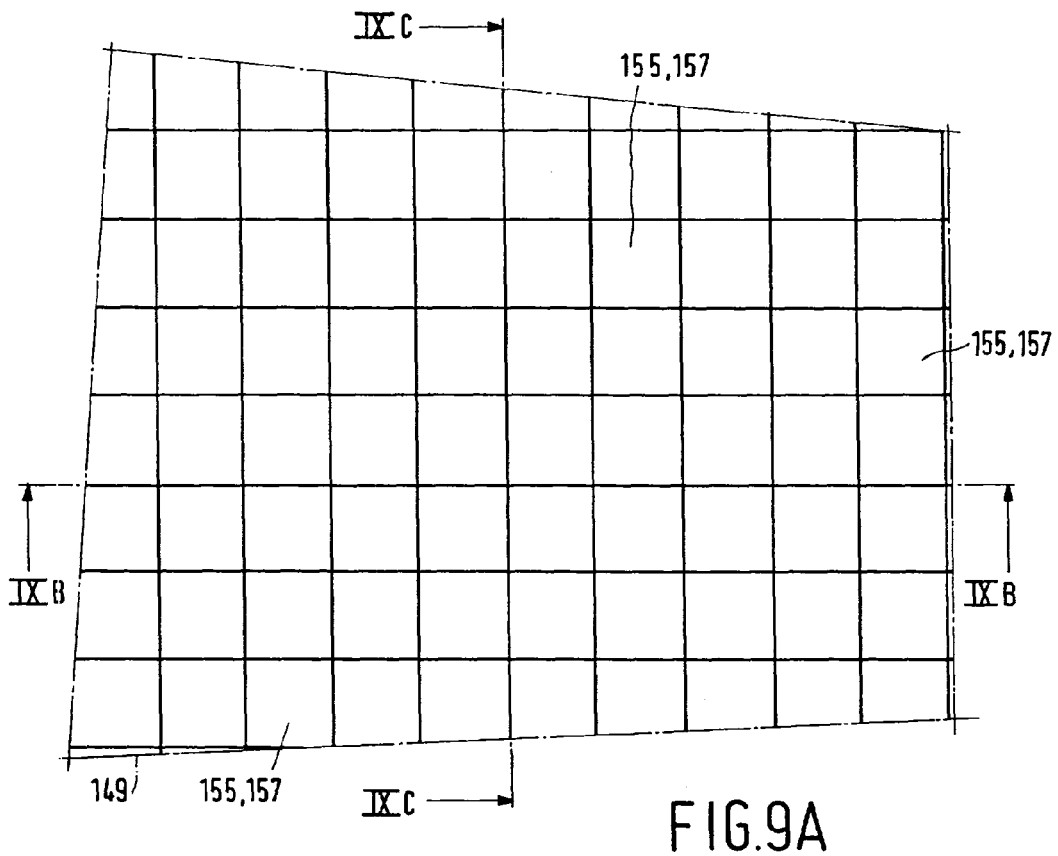
Figure 9B:
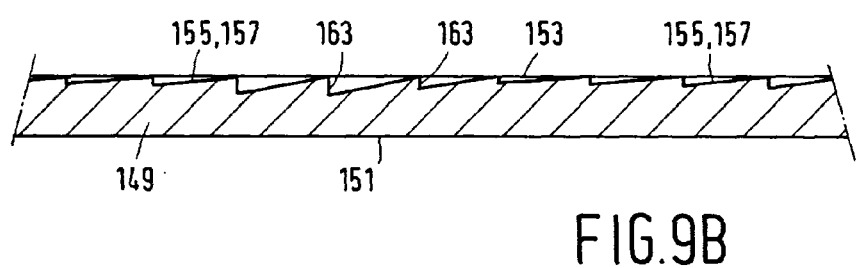
Figure 9C:
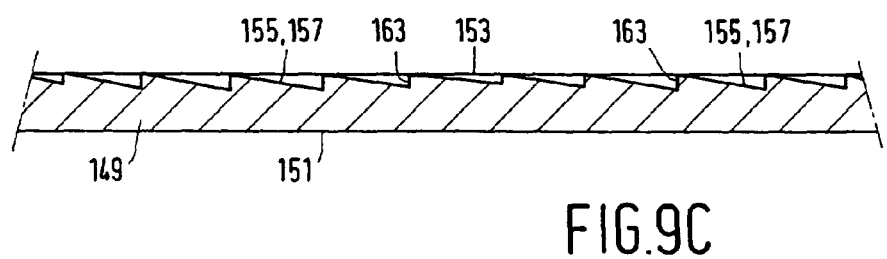
Figure 10A:
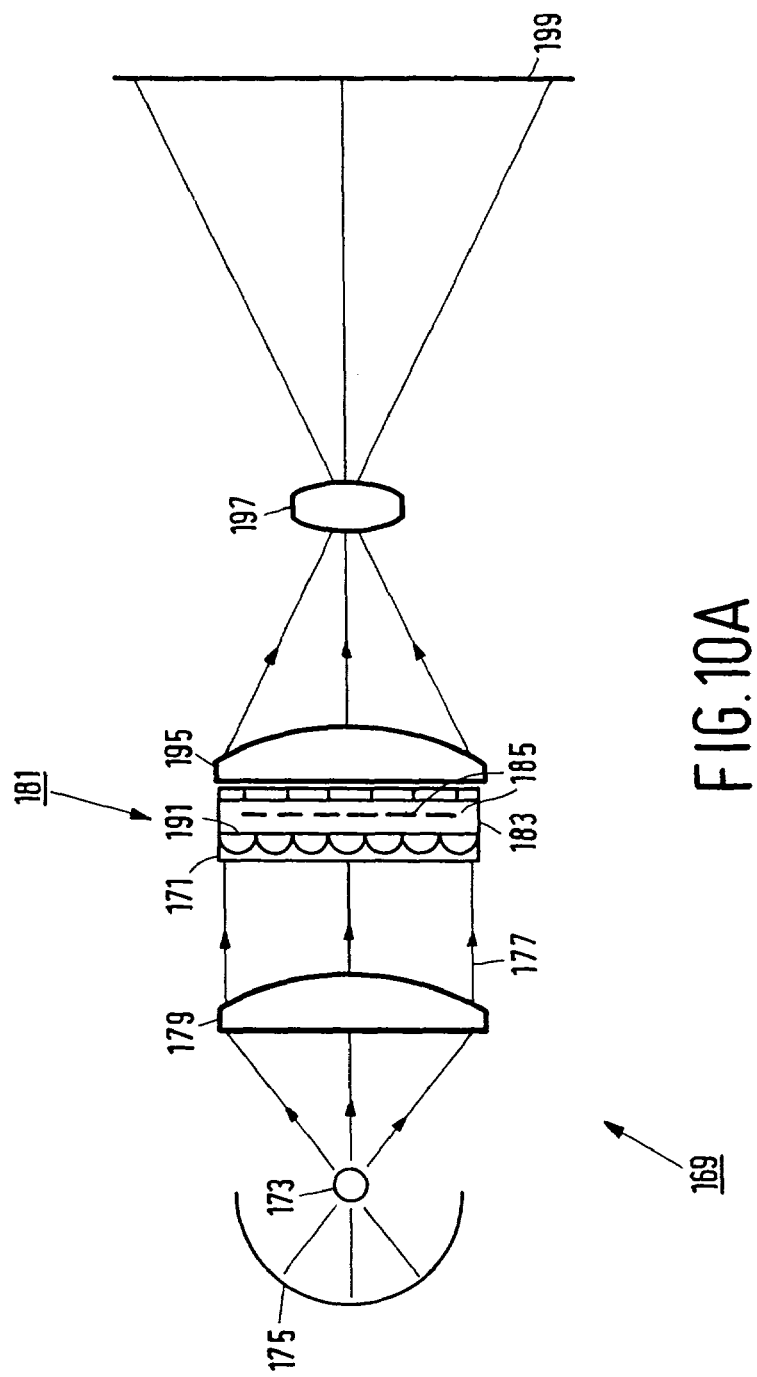
Figure 10B:
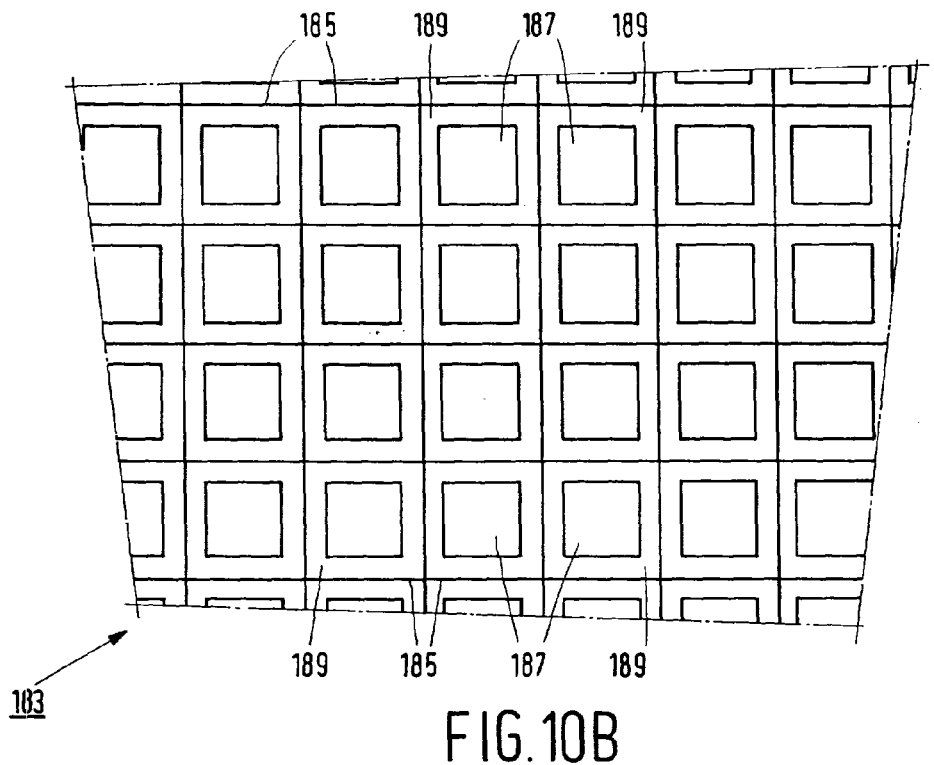
Figure 10C:
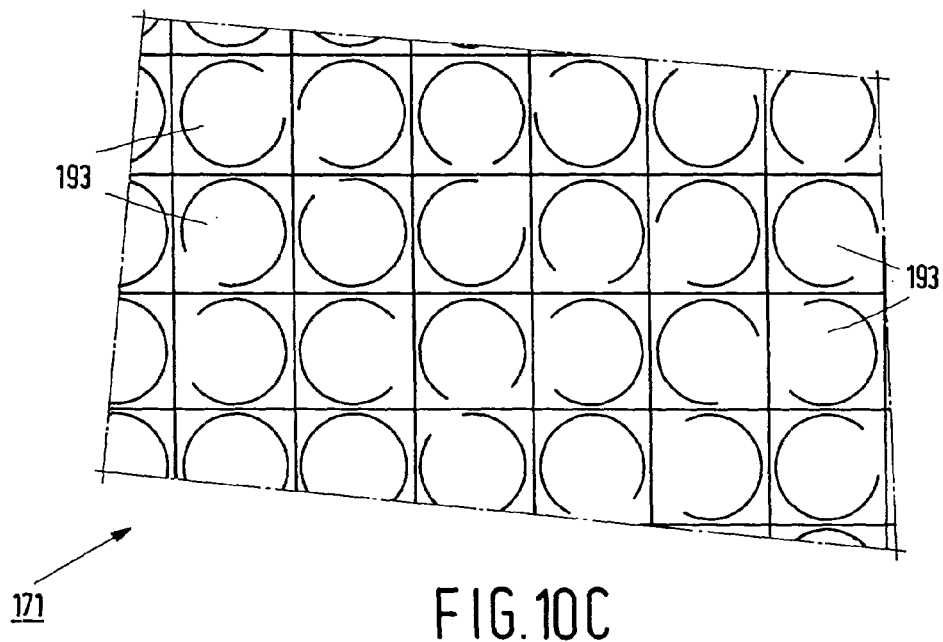
Figure 11A:
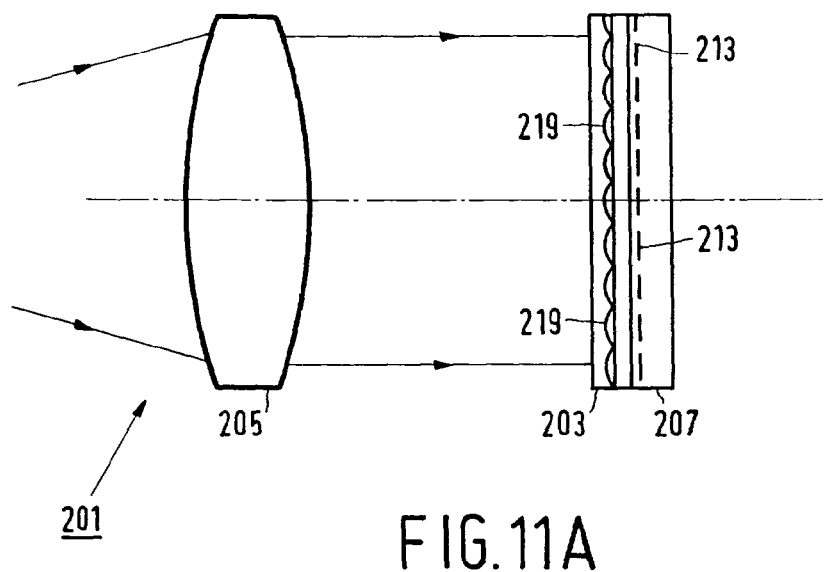
Figure 11B:
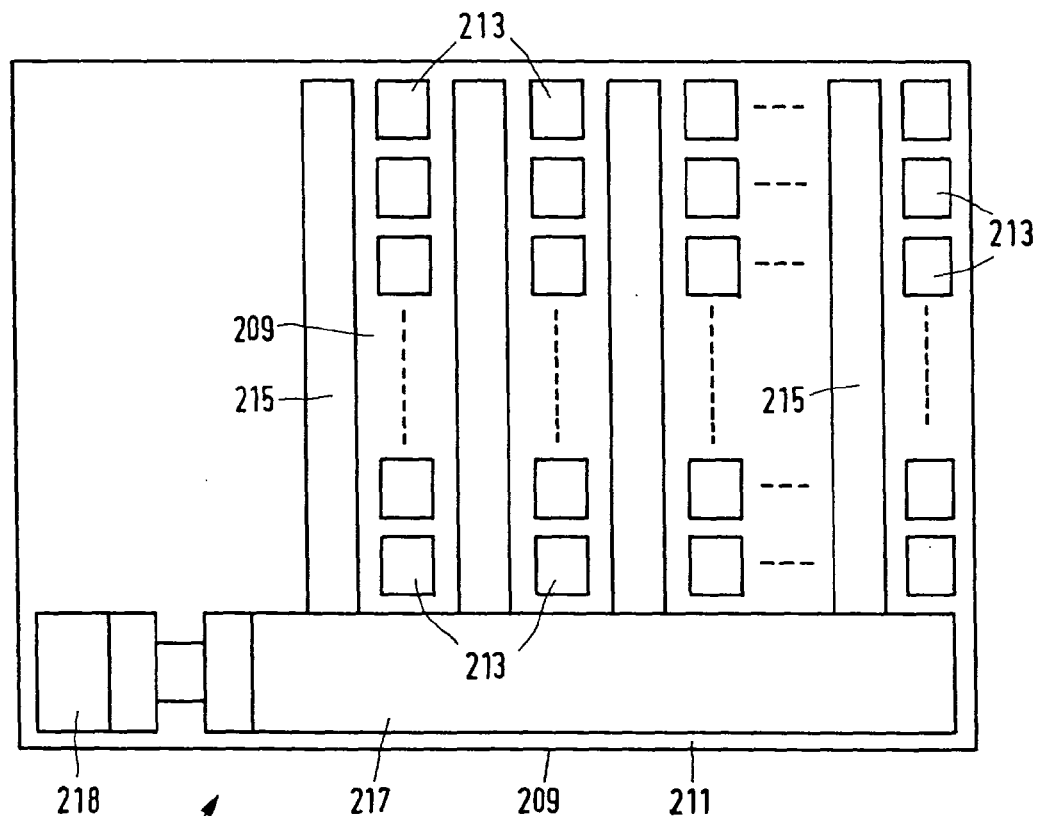
Figure 12:
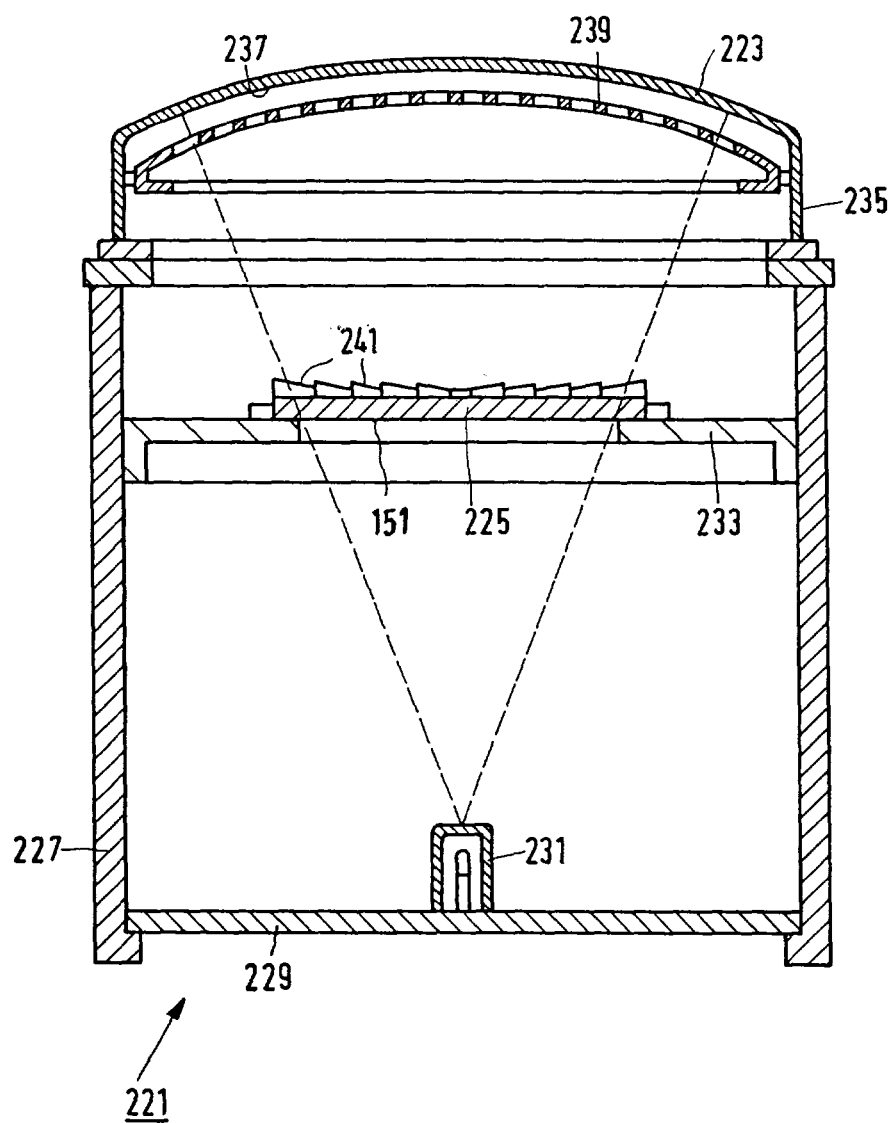

FIG. 1 is a plan view of a device for implementing a method according to the invention, FIG. 2 is a cross-section taken on the line II—II in FIG. 1, FIG. 3 shows the process of imprinting a die of the device of FIG. 2 in a mould, FIG. 4a is a plan view of a mould manufactured by the device of FIG. 1, FIG. 4b is a cross-section taken on the line IVb—IVb in FIG. 4a, FIG. 4c is a cross-section taken on the line IVc—IVc in FIG. 4a, FIG. 5a is a plan view of a portion of a lens array manufactured with the mould of FIG. 4a, FIG. 5b is a cross-section taken on the line Vb—Vb in FIG. 5a, FIG. 6 shows a tool holder and a die holder, partly in side elevation and partly in cross-section, of an alternative embodiment of a device for implementing a method according to the invention, FIG. 7 shows the tool holder and die holder of FIG. 6 partly in front elevation and partly in cross-section, FIG. 8a is a plan view of a mould manufactured by means of the alternative embodiment of the device as shown in FIG. 6, FIG. 8b is a cross-section taken on the line VIIIb—VIIIb in FIG. 8a, FIG. 8c is a cross-section taken on the line VIIIc—VIIIc in FIG. 8a, FIG. 9a is a plan view of a portion of a faceted lens manufactured with the mould of FIG. 8a, FIG. 9b is a cross-section taken on the line IXb—IXb in FIG. 9a, FIG. 9c is a cross-section taken on the line IXc—IXc in FIG. 9a, FIG. 10a diagrammatically shows a picture display device with a lens array made with a mould manufactured by the device of FIG. 1, FIG. 10b diagrammatically shows a number of pixels of the picture display device of FIG. 10a, FIG. 10c shows a portion of a microlens array of the picture display device of FIG. 10a, FIG. 11a diagrammatically shows a camera provided with a solid state image sensor device, FIG. 11b diagrammatically shows a portion of the solid state image sensor device of the camera of FIG. 11a and FIG. 12 diagrammatically shows a device comprising a faceted lens for the manufacture of a front panel for a colour picture tube.

The device 1 for implementing a method according to the invention as shown in FIGS. 1 and 2 comprises a workpiece holder 3 with a support surface 5 which extends parallel to an X-direction and to a Y-direction perpendicular to the X-direction, and on which a mould 7 to be manufactured can be placed and fastened by clamping means 9 diagrammatically shown in FIG. 2. The device 1 further comprises a positioning device 11 diagrammatically shown in FIGS. 1 and 2 with a straight guide 13 extending parallel to the X-direction and an X-slide 15. The X-slide 15 is displaceable along the straight guide 13 by means of a spindle 17 which can be driven by an electric motor 21 via a transmission 19. The spindle 17 is journalled relative to a frame 23 of the device 1, and the electric motor 21 is fastened to the frame 23. The X-slide 15 is provided with a straight guide 25 extending parallel to the Y-direction along which a Y-slide 27 is displaceable by means of a spindle 29 which can be driven by an electric motor 33 via a transmission 31. The spindle 29 is journalled relative to the X-slide 15, and the electric motor 33 is fastened to the X-slide 15. As FIG. 2 shows, the Y-slide 27 is provided with a straight guide 35 which extends parallel to a Z-direction which is perpendicular to the X-direction and to the Y-direction. A Z-slide 37 is displaceable along the straight guide 35 by means of a spindle 39 which can be driven by an electric motor 43 via a transmission 41. The spindle 39 is journalled relative to the Y-slide 27, and the electric motor 43 is fastened to the Y-slide 27. It is noted that only the transmission 41 and the electric motor 43 of the Z-slide 37 are visible in FIG. 1.

As FIG. 2 further shows, a tool holder 45 is fastened to the Z-slide 37, which holder is provided with a circular-cylindrical stepped chamber 47 with a centreline 49 which extends parallel to the Z-direction. The stepped chamber 47 comprises a first chamber portion 51 and a second chamber portion 53 which has a smaller diameter than the first chamber portion 51. The second chamber portion 53 constitutes a straight guide for a round shaft 55 of a die holder 57 which slides parallel to the Z-direction relative to the second chamber portion 53 and is provided with an end disc 59. The end disc 59 bears on a stop 63, formed by a shoulder of the stepped chamber 47, under the influence of a previously defined pretensioning force of a mechanical helical spring 61 arranged in the first chamber portion 51. As FIG. 2 further shows, a die 65 is fastened to the die holder 57, with a smooth spherical die surface 67 and manufactured from, for example, a hard steel or sapphire. The tool holder 45 and the die holder 57 are jointly displaceable relative to the workpiece holder 3 in directions parallel to the X-direction, Y-direction and Z-direction by means of the positioning device 11.

The mould 7 is shown in detail in FIGS. 4a, 4b and 4c and is manufactured by the device 1 in accordance with a method to be described in more detail below. The mould 7 is designed for the manufacture of optical elements which are provided with mutually adjoining optical sub-elements arranged relative to one another in a pattern such as, for example, so-called lens arrays or so-called faceted lenses. FIGS. 5a and 5b show an example of such a lens array 69. The optical sub-elements of the lens array 69 are spherical lenses 71 provided at one side 73 of the lens array 69 in accordance with a two-dimensional hexagonal array. As FIG. 5b shows, the lens array 69 is provided with a plane surface 75 at the other side. The lens array 69 is manufactured by means of the mould 7 by a replication technique which is usual and known per se such as, for example, a replication technique whereby the mould 7 is filled with a liquid synthetic resin which cures under the influence of ultraviolet radiation, the mould 7 being subsequently covered with a plate 77 shown in FIGS. 4b and 4c and manufactured from a transparent synthetic material with a refractive index corresponding to the refractive index of the synthetic resin in the mould 7. It is noted that FIG. 4a only shows an outline of the plate 77 with a broken line. The synthetic resin in the mould 7 is cured in that it is exposed to ultraviolet radiation through the transparent plate 77, and the lens array 69 shown in FIGS. 5a and 5b is formed, built up from said transparent plate 77 and the array of optical sub-elements 71 formed by means of the mould 7.

The mould 7 is manufactured from a ductile metal such as, for example, copper, aluminium, zinc, or an alloy comprising these metals. As FIG. 4a shows, the mould 7 comprises a mould chamber 79 with a plane bottom 81 in which a mould shape 83 is provided by the device 1 in accordance with the method, so as to correspond to the pattern of sub-elements 71 of the optical element 69 to be manufactured. It is noted that FIG. 4a shows only a few parts of the mould shape 83 for simplity's sake. According to the method, the bottom 81 of the mould chamber 79 is first given a surface smoothness of optical quality desired for the optical element 69 in a manner usual and known per se, for example, by means of a diamond milling tool.

The mould 7 is subsequently fastened to the tool holder 3 of the device 1 such that the bottom 81 of the mould chamber 79 extends parallel to the X-direction and Y-direction. The spherical die surface 67 of the die 65 corresponds to one optical sub-element, i.e. a single spherical lens 71 of the optical element 69 to be manufactured. According to the method, the mould shape 83 in the bottom 81 of the mould chamber 79 is provided in that the die 65 is displaced into consecutive positions on the bottom 81 by means of the positioning device 11 in accordance with the hexagonal pattern of sub-elements 71 of the optical element 69 to be manufactured, the die 65 being imprinted in the bottom 81 in each position. The imprinting process of the die 65 is shown in detail in FIG. 3. After the die 65 has been displaced into a next position through a displacement of the X-slide 15 and/or the Y-slide 27, during which the die holder 57 rests against the stop 63 of the chamber 47, the die 65 is pressed into the bottom 81 through a displacement of the Z-slide 37. As FIG. 3 shows, the end disc 59 of the die holder 57 then clears the stop 63, so that the die 65 is imprinted in the bottom 81 with a force which corresponds to the predetermined pretensioning force of the mechanical helical spring 61. It is achieved through a favourable choice of the pretensioning force and of the elasticity modulus of the helical spring 61 that the increase in the pretensioning force of the helical spring 61 upon clearance of the end disc 59 is negligibly small, so that the force with which the die 65 is imprinted in the bottom 81 is substantially independent of the position occupied by the Z-slide 37 and the tool holder 45 parallel to the Z-direction during imprinting. No stringent requirements need accordingly be imposed on the positioning accuracy of the Z-slide 37.

While the die 65 is being imprinted in the bottom 81 of the mould 7, the ductile metal of the mould 7 present below the die surface 67 is plastically deformed, so that said metal assumes a shape corresponding to that of the die surface 67, i.e. to an optical sub-element 71 of the optical element 69. The complete mould shape 83 is formed in the bottom 81 in that the die 65 is imprinted repeatedly in consecutive positions in accordance with the pattern of the optical element 69.

It is noted that a suitable choice of the force with which the die 65 is imprinted in the mould 7 achieves that the ductile metal of the mould 7 is plastically deformed exclusively in the immediate vicinity of the contact surface between the die 65 and the bottom 81. The plastic deformation at some distance from said contact surface is found to be negligibly small, so that a portion of the mould shape 83 adjoining the contact surface and already formed in the mould 7 is not deformed again upon imprinting of the current shape corresponding to the sub-element. It is assumed that the negligibly small deformation at some distance from the contact surface can be explained from the fact that the ductile metal of the mould 7 has a polycrystalline structure, with cavities present between the individual crystals. When a comparatively small force is exerted on the surface of the ductile metal, no shearing takes place between the crystals and inside the lattices, and only the cavities present between the crystals are made smaller through compression of the ductile metal present below the die 65. Since no shearing takes place, there will be no plastic deformation of the portion of the mould shape 83 already formed. If shearing should take place between the crystals and in the lattices in the case of stronger forces, so that a plastic deformation occurs of the metal present at some distance from the die 65, this deformation will be comparatively small because the quantity of metal to be displaced is comparatively small in view of the comparatively small impression depths of the spherical die surface 67 and because the metal to be displaced is spread over a comparatively large volume.

The mould 7 shown in FIGS. 4a, 4b, 4c and used for the manufacture of the lens array 69 shown in FIG. 5a has a two-dimensional hexagonal array of spherical imprints 85. The pitch s of the adjoining imprints shown in FIGS. 4b and 4c is approximately 0.15 mm in the example shown, while the impression depth d shown in FIGS. 4b and 4c is approximately 6 μm. Such an array is formed by means of a spherical die surface 67 with a radius of approximately 0.5 mm and a pretensioning force of approximately 10 N. Since the die surface 67 corresponds to a single optical sub-element 71 of the optical element 69, the ductile metal can flow optimally around the die surface 67 upon each impression of the die 65, so that particularly sharp boundaries 87 are formed between the individual imprints 85 forming the mould shape 83. As FIGS. 4b and 4c show, the boundaries 87 between the imprints 85 of the mould 7 each form part of a circle, i.e. the boundaries 87 each correspond to a portion of a parallel of latitude of the spherical die surface 65. The mould 7 thus has a particularly high dimensional accuracy, i.e. substantially all points on the surface of the mould shape 83 form part of the spherical surface of one of the imprints 85. The optical elements 69 to be manufactured by means of the mould 7 as a result have a particularly large useful optical surface, i.e. substantially all points at the side 73 of the optical element 69 form part of the spherical surface of one of the optical sub-elements 71.

The lens matrix 69 shown in FIGS. 5a and 5b and manufactured with mould 7 is a so-called microlens array. Such a microlens array comprises a large number of microlenses with a diameter smaller than, for example, 1 mm. Since the die surface 67 of the die 65 used corresponds to only one optical sub-element, i.e. one microlens 71 of the lens array 69, the die 65 can be manufactured in a simple manner. It was found in practice that the surface smoothness of the bottom 81 of the mould 7 is not affected by the imprinting process of the die 65 in the bottom 81 of the mould 7. Since the bottom 81 is first provided with the desired surface smoothness according to the invention and is then given the mould shape 83 by the die 65, the desired surface smoothness is achieved in a comparatively simple manner.

While the mould shape 83 is being provided, the presence of dust and dirt particles between the bottom 81 of the mould 7 and the die surface 67 should be prevented because such dust and dirt particles can damage the mould shape 83. Providing the mould shape 83 by means of the die 65 should accordingly take place in a substantially dust-free environment such as, for example, in a conditioned space. In a special embodiment of the device 1, the tool holder 3 is arranged in a liquid bath 89, indicated with a broken line in FIG. 2 and filled, for example, with water during operation. In this special embodiment, the mould 7 is immersed in the liquid bath 89 while the mould shape 83 is being provided, whereby the presence of dust and dirt particles between the die 65 and the bottom 81 of the mould 7 is prevented in a simple and effective manner.

FIGS. 6 and 7 diagrammatically show a tool holder 91 and a die holder 93 of an alternative embodiment of a device 95 for carrying out a method according to the invention. The tool holder 91 is substantially identical to the tool holder 45 of the device 1, and corresponding parts of the tool holders 45 and 91 and of the devices 1 and 95 are given the same reference numerals below. Like the die holder 57, the die holder 93 has a round shaft 97 which slides in the second chamber portion 53 of the tool holder 91 and an end disc 99 which bears against the stop 63 of the stepped chamber 47 under the influence of a predetermined pretensioning force of a mechanical helical spring 101 arranged in the first chamber portion 51. The round shaft 97 and the end disc 99 belong to a first, furcate carrier 103 of the die holder 93. As FIGS. 6 and 7 show, the first carrier 103 comprises two circular pivot guides 105, 107 for a second carrier 109 of the die holder 93 which is provided with two circular slots 111, 113 for cooperating with the pivot guides 105, 107. The second carrier 109 is pivotable relative to the first carrier 103 about a first virtual pivot axis 115 of the pivot guides 105, 107, which is directed parallel to the X-direction, through the use of pivot guides 105, 107. As FIGS. 6 and 7 further show, the second carrier 109 comprises two circular pivot guides 117, 119 for a third carrier 121 of the die holder 93 which is provided with two circular slots 123, 125 for cooperating with the pivot guides 117, 119. The third carrier 121 is pivotable relative to the second carrier 109 about a second virtual pivot axis 127 of the pivot guides 117, 119, which is directed parallel to the Y-direction and intersects the first virtual pivot axis 115, through the use of pivot guides 117, 119. A die 129 is fastened to the third carrier 121 and is provided with a plane, rectangular die surface 131. In a neutral position of the second carrier 109 relative to the first carrier 103 and of the third carrier 121 relative to the second carrier 109, the die surface 131 extends parallel to the X-direction and the Y-direction, while the point of intersection of the first virtual pivot axis 115 and the second virtual pivot axis 127 is situated in a centre M of the die surface 131.

As FIGS. 6 and 7 further show, a first linear electrical actuator 133, which is usual and known per se, is fastened to the first carrier 103, an output shaft 135 of the actuator being coupled to a coupling rod 137 fastened to the second carrier 109. A second linear electrical actuator 139 identical to the first actuator 133 is fastened to the second carrier 109 and has an output shaft 141 which is coupled to a coupling rod 143 fastened to the third carrier 121. A pivot angle α of the second carrier 109 about the first virtual pivot axis 115 is adjustable by means of the first actuator 133, while a pivot angle β of the third carrier 121 about the second virtual pivot axis 127 is adjustable by means of the second actuator 139. As FIGS. 6 and 7 show, the round shaft 97 of the die holder 93 is fastened to the first chamber portion 51 via an elastically deformable membrane 145, so that the carriers 103, 109, and 121 and the die 129 are not rotatable about the centreline 49 of the tool holder 91.

The device 95 is used for the manufacture of a mould 147 shown in FIGS. 8a, 8b, 8c and designed for the manufacture of so-called faceted lenses. FIGS. 9a, 9b and 9c show an example of such a faceted lens 149. The faceted lens 149 is provided at one side with a plane surface 151 and at the other side 153 with a two-dimensional orthogonal array of rectangular optical sub-elements 155, each sub-element 155 having a plane lens surface 157 which has been pivoted about two mutually perpendicular pivot axes relative to a reference plane of the faceted lens 149 which may be, for example, the plane surface 151. The faceted lens 149 is manufactured by means of the mould 147 by a replication technique such as, for example, the replication technique described above for the manufacture of the lens array 69.

Like the mould 7, the mould 147 is made from a ductile metal, a bottom 159 of the mould 147 being first provided with a surface smoothness of optical quality as desired for the faceted lens 149. Then the mould 147 is fastened on the workpiece holder 3 of the device 95 such that the bottom 159 of the mould 147 lies parallel to the X-direction and the Y-direction. The rectangular plane die surface 131 of the die 129 corresponds to one optical sub-element 155 of the faceted lens 149. According to the method, the bottom 159 of the mould 147 is given a mould shape 161 corresponding to the faceted lens 149 by moving the die 129 into consecutive positions on the bottom 159 by the positioning device 11 of the device 95 in accordance with the orthogonal pattern of sub-elements 155 of the faceted lens 149, while pivoting the die 129 in each position about previously defined angles α and β about the virtual pivot axes 115, 127 by means of the actuators 133, 139 and subsequently imprinting in the bottom 159 with a force corresponding to the predetermined pretensioning force of the helical spring 101. The angles α and β are independently adjustable. In addition, the angles α and β may be differently adjusted for consecutive moulds to be manufactured, so that a large number of different moulds can be manufactured by means of the device 95. It is noted that FIG. 8a shows only a few portions of the mould shape 161 for simplicity's sake.

As was also noted above with reference to the device 1, the device 95 is particularly suitable for the manufacture of optical elements which comprise a comparatively large number of optical sub-elements of comparatively small dimensions. As FIGS. 9b and 9c show, the faceted lens 149 manufactured by means of the mould 147 comprises usual discontinuous boundaries 163 between the individual sub-elements 155 which cause an undesirable scattering of the light radiated through the faceted lens 149. When the faceted lens 149 is positioned, for example, between a point-shaped light source and a flat screen, irregularities in the illumination of the screen arise from scattering. Since the faceted lens 149 manufactured by means of the mold 147 has a comparatively large number of sub-elements 155 each of comparatively small dimensions (for example, 1 mm or smaller), the discontinuous boundaries 163 have comparatively small dimensions so that irregularities are comparatively small and an even illumination of the screen is provided.

FIG. 10a diagrammatically shows a picture display device 169 comprising a microlens array 171 manufactured by a method according to the invention. Such a picture display device provided with a microlens array which is known per se is known from, for example, EP-A-0 574 269. The picture display device 169 comprises an optical radiation source 173 and a reflector 175. The light radiated by the radiation source 173 is shaped into a parallel light beam 177 by means of a converging optical system represented in FIG. 10a as a single condenser lens 179 for simplity's sake. The picture display device 169 further comprises a picture display system such as, for example, a liquid crystal display panel 181 diagrammatically shown in FIG. 10a. The display panel 181 is provided with a liquid crystal layer 183 which is usual and known per se and which comprises a two-dimensional orthogonal array of picture display elements or pixels 185. It is noted that only a lateral edge of the liquid crystal layer 183 is visible in FIG. 10a. As FIG. 10b shows, the pixels 185 each comprise an optically useful portion 187 surrounded by an electronic switching element 189 which is shown diagrammatically only and by means of which the optically useful portion 187 of the pixel 185 is separately optically adjustable. As FIG. 10b shows, the optically useful portion 187 of each pixel 185 is limited to a central portion of the pixel 185 by the presence of the switching element 189. As FIG. 10a shows, the liquid crystal display panel 181 is provided with the microlens array 171 mentioned above at a side 191 of the liquid crystal layer 183 where the light is incident. As FIG. 10c shows, the microlens array 171 comprises a two-dimensional orthogonal matrix of spherical microlenses 193 wherein each microlens 193 corresponds to one of the pixels 185 of the liquid crystal layer 183. The microlens array 171 focuses the parallel light beam 177 onto the optically useful surfaces 187 of the individual pixels 185 of the liquid crystal layer 183. As FIG. 10a shows, the picture display device 169 further comprises a field lens 195 by means of which the light originating from the display panel 181 is converged towards a projection lens system which is represented as a single projection lens 197 for simplicity's sake, and a projection screen 199. Since the microlens array 171 was manufactured by a method according to the invention, the microlens array 171 has a particularly large useful optical surface, so that the parallel light beam 177 is scattered to a very limited degree only and is focused substantially completely onto the optically useful surfaces 187 of the individual pixels 185 of the liquid crystal layer 183. The picture display device 169 accordingly has a particularly great light output.

FIG. 11a diagrammatically shows a camera 201 provided with a microlens array 203 manufactured by a method according to the invention. The camera 201 comprises an objective lens system which is represented as a single objective lens 205 in FIG. 11a for simplicity's sake. The camera 201 further comprises an image sensor system with a solid state image sensor device 207 diagrammatically shown in FIG. 11a and provided with the microlens array 203 at a side which faces the objective lens 205. It is noted that lateral edges of the microlens array 203 and of the solid state image sensor device 207 are visible only in FIG. 11a. The solid state image sensor device 207 is diagrammatically shown in FIG. 11b. Such a solid state image sensor device of the IT type (Interline Type) provided with a microlens array known per se is disclosed in, for example, JP-A-1-257901. As FIG. 11b shows, the solid state image sensor device 207 comprises a semiconductor body 209 which is provided at a surface 211 with a two-dimensional orthogonal array of image sensor elements or photodiodes 213 for converting radiation into electric charges which can be transported to an electronic read-out unit 218 shown diagrammatically only in FIG. 11b through a system of so-called vertical charge coupled devices 215 and a horizontal charge coupled device 217. The charge coupled devices 215, 217 are shielded against radiation by a protective layer of, for example, aluminum. As is apparent from FIG. 11b, the optically useful surface area of the solid state image sensor device 207 is limited to the areas of the photodiodes 213. The microlens array 203, which is not shown in FIG. 11b for the sake of clarity, comprises a two-dimensional orthogonal array of spherical microlenses 219 corresponding to the microlens array 171 shown in FIG. 10c, each microlens 219 corresponding to one of the photodiodes 213 of the solid state image sensor device 207. The microlens array 203 at the light incidence side of the solid state image sensor device 207 focuses the light incident on the solid state image sensor device 207 through the objective lens 205 onto the optically useful surfaces of the individual photodiodes 213. Since the microlens array 203 was manufactured by a method according to the invention, the microlens array 203 has a particularly large useful optical surface area, so that the light incident on the solid state image sensor device 207 is scattered to a very limited degree only and is substantially completely focused onto the optically useful surface areas of the individual photodiodes 213. The camera 201 and the solid state image sensor device 207 used therein accordingly have a particularly high photosensitivity. It is noted that a microlens array manufactured by the method according to the invention is also applicable in a solid state image sensor device of the FT type (Frame Transfer type), in which the charge coupled devices used are themselves provided with the required image sensor elements, and in, for example, "still-picture" image sensor devices.

FIG. 12 diagrammatically shows a device 221 for manufacturing a front panel 223 for a color picture tube. The device 221 is provided with a faceted lens 225 manufactured by a method according to the invention. Such a device provided with a faceted lens known per se is known, for example, from EP-A-0 294 867 (=U.S. Pat. No. 4,866,466). As FIG. 12 shows, the device 221 comprises a housing 227 with a bottom 229 on which a point-shaped light source 231 is centrally positioned. A first holder 233 for the faceted lens 225 and a second holder 235 for the front panel 223 to be manufactured by means of the device 221 are further present in the housing 227. As FIG. 12 shows, a shadow mask 239 belonging to the front panel 223 is also arranged on the second holder 235 at an inside 237 of the front panel 223.

The shadow mask 239 is in a position relative to the front panel 223 which corresponds to a position occupied by the shadow mask 239 relative to the front panel 223 in a color picture tube which is to incorporate the front panel 223 and the shadow mask 239.

The inside 237 of the front panel 223 is provided with a so-called symmetrical black matrix, in which openings are present, by means of the device 221. A phosphor will be deposited in the openings of the black matrix during subsequent steps in the manufacture of the front panel 223, so that the latter is provided with the required phosphor dots. The inside 237 of the front panel 223 is for this purpose first provided with a layer of photosensitive material such as, for example, a positive photoresist which is usual and known per se. Then the photosensitive material on the front panel 223 is exposed through the shadow mask 239 by means of the device 221, after which the exposed material is developed with a developer liquid. Since the openings in the black matrix to be formed in this way must coincide with the points of incidence of the electron beams formed in the relevant color picture tube by the shadow mask 239, and since the electron beams in the relevant color picture tube in general follow curved paths, the light of the light source 231 must so be deflected by means of the faceted lens 225 that the projections of the light source 231 formed by the shadow mask 239 on the front panel 223 coincide with the points of incidence of the electron beams. The faceted lens 225 for this purpose has a two-dimensional orthogonal array of rectangular plane facets 241 corresponding to the faceted lens arrangement 149 shown in FIG. 9a, which facets have all been pivoted about two mutually perpendicular pivot axes which extend parallel to the surface 151 of the faceted lens 225 through angles whose values follow from paths of the electron beams. As was discussed above with reference to the faceted lens 149 shown in FIGS. 9a, 9b, 9c, the faceted lens 225 manufactured by the method according to the invention has a comparatively large number of sub-elements 241 of comparatively small dimensions, so that the light from the light source 231 incident on the faceted lens 225 is scattered to a very limited degree only and a particularly even illumination of the front panel 223 by the faceted lens 225 is achieved.

The optical elements 69, 149, 171, 203, 225 mentioned above all have regular patterns of optical sub-elements 71, 155, 193, 219, 241, the optical sub-elements 71, 193 and 219 of the optical elements 69, 171 and 203 being identical to one another. It is noted that it is also possible to manufacture optical elements with optical sub-elements which are not identical by means of the method according to the invention. Among the examples mentioned above were the faceted lenses 149, 225 whose facets 155, 241 were pivoted about mutually different angles. According to the method, however, lens arrays may also be manufactured which are provided with mutually differing lenses. To achieve this, however, a number of different dies must be used corresponding to the number of different lenses in the lens array to be manufactured. In addition, the method allows for the manufacture of optical elements wherein the optical sub-elements are arranged in a different pattern, wherein the optical sub-elements are arranged in an irregular pattern, or wherein a different type of sub-element is used. It is also possible to manufacture optical elements by the method wherein the optical sub-elements are not convex, concave, or flat lenses, as in the lens matrices 69, 171, 203 and the faceted lenses 149, 225, but wherein the optical sub-elements are, for example, plane, convex, or concave mirrors.

The dies 65, 129 mentioned above have die surfaces 67, 131 each corresponding to a single optical sub-element 71, 155, 193, 219, 241 of the optical elements 69, 149, 171, 203, 225 to be manufactured. It is noted that it is also possible to use a die provided with a die surface corresponding to two or more optical sub-elements of the optical element to be manufactured. The manufacture of such a multiple, single-piece die is more time-consuming, but the provision of the shape proceeds more quickly by means of said multiple die. In addition, such a multiple die must be positioned relative to the mold with a higher accuracy in the X- and Y-directions, otherwise a deviation in the interspacings between the optical sub-elements will arise at regular intervals, which leads to an optical deviation of the optical element to be manufactured. When a single die is used, this deviation in the interspacings between the optical sub-elements will arise between each pair of adjoining sub-elements, so that no regularly repeated deviation arises here.

It is further noted that instead of the replication technique described above, whereby the optical elements are manufactured from a synthetic resin material which is cured under the influence of ultraviolet radiation, an alternative replication technique may be used, for example a replication technique whereby the optical elements are manufactured from a thermosetting synthetic resin.

The molds 7, 147 described above have planar bottoms 81, 159 in which the desired mold shapes 83, 161 are provided by means of the dies 65, 129. It is noted that the mold shape may alternatively be provided in a non-planar bottom of the mold, given a positioning device for the die which is suitable for this purpose. A non-planar mold bottom may be used, for example, in the manufacture of faceted lenses in which the pivot angles of the facets have a strong gradient. The mold bottom may be provided here, for example, with a curvature corresponding to an average gradient of the pivot angles. When the facets are provided in the mold bottom thus manufactured, the die need be pivoted relative to the mold bottom locally over small angles only, so that the mold bottom is plastically deformed to a small degree only during imprinting of the die, and a plastic deformation of the adjoining facets already formed is prevented. It is also possible to manufacture an optical element by the method, for example, which is provided with a pattern of spherical lenses arranged on a spherical or aspherical basic body.

It is further noted that instead of the positioning device 11 an alternative type of positioning device may be used. Also, the device 1, 95 may be provided with a different type of die holder such as, for example, a die holder in which the predetermined impression force of the die is supplied by a hydraulic cylinder.

The picture display device 169 and camera 201 shown diagrammatically only in the Figures and discussed briefly above only comprise a single display panel 181 and only a single solid state image sensor device 207, respectively. It should finally be noted that such a picture display device and camera may alternatively comprise more than one display panel and more than one solid state image sensor device, respectively, which device and camera are each provided with a system of colour separation prisms, usual and known per se, for splitting up the light beam into a number of basic colors, while the picture display device and camera are provided with a separate display panel and a separate solid state image sensor device, respectively, for each color.

The invention claimed is:

1. A method of manufacturing a mold for use in the manufacture of an optical element provided with mutually adjoining optical sub-elements arranged relative to one another in a pattern, by which method the mold is given a mold shape which corresponds to the pattern of sub-elements, the mold shape comprising consecutive sub-shapes corresponding to respective optical sub-elements, characterized in that the mold is manufactured from a ductile metal and is given the mold shape by means of a die having a die surface corresponding to the sub-shape, which sub-shape is imprinted in the mold with a predetermined force substantially independent of the position occupied by the die during imprinting, said predetermined force plastically deforming the ductile metal exclusively at the area of the surface contact between the mold and the die, one sub-shape at a time in consecutive positions in accordance with the pattern, each position corresponding to a single sub-element.

2. A method of manufacturing an optical element provided with mutually adjoining optical sub-elements arranged relative to one another in a pattern, by which method a mold is given a mold shape which corresponds to the pattern of sub-elements and the optical element is manufactured with said mold by a replication technique, the mold shape comprising consecutive sub-shapes corresponding to respective optical sub-elements, characterized in that the mold is manufactured from a ductile metal and is given the mold shape by means of a die having a die surface corresponding to the sub-shape, which sub-shape is imprinted in the mold with a predetermined force substantially independent of the position occupied by the die during imprinting, said predetermined force plastically deforming the ductile metal exclusively at the area of the surface contact between the mold and the die, one sub-shape at a time in consecutive positions in accordance with the pattern, each position corresponding to a single sub-element.

3. A method as claimed in claim 1 wherein the mold is given the mold shape by means of the die after the mold has been previously provided with a surface smoothness desired for the optical element.

4. A method as claimed in claim 1 wherein the mold is immersed in a liquid bath during the application of the mold shape by means of the die.

5. A method as claimed in claim 1 wherein the ductile metal comprises copper, aluminum, or zinc.

6. A method as claimed in claim 1 wherein the die is provided with a spherical die surface and is imprinted in the mold in accordance with a hexagonal pattern.

7. A method as claimed in claim 2 wherein the die has a flat die surface and is imprinted in the mold in accordance with an orthogonal pattern, while the die is pivoted through predetermined angles about two mutually perpendicular pivot axes in the consecutive position of the pattern, which axes intersect one another in a center of the die surface.

8. A method of manufacturing a front panel for a color picture tube, in which method an optical element manufactured by the method as claimed in claim 7 is used, characterized in that an inside of the front panel is provided with a layer of photosensitive material, and in that the front panel is subsequently illuminated through a shadow mask positioned at the inside of the front panel by means of a point-shaped light source, while the optical element is positioned between the shadow mask and the light source.

9. A device for the manufacture of a front panel for a color picture tube, which device is provided with an optical element manufactured by the method as claimed in claim 7, characterized in that the device is provided with, in that order, a point-shaped light source, a first holder for the optical element, and a second holder for the front panel and for a shadow mask to be arranged at an inside of the front panel.

10. A liquid crystal display panel provided with an optical element manufactured by a method as claimed in claim 2 wherein the optical element is a microlens array, and the display panel is provided with a liquid crystal layer which comprises a pattern of picture display elements and which adjoins the microlens array at a side where the light is incident, while each optical sub-element of the microlens array corresponds to one of the picture display elements of the liquid crystal layer.

11. A picture display device provided with an optical element manufactured by a method as claimed in claim 2 wherein the optical element is a microlens array, while the picture display unit is provided with, in that order, an optical radiation source, a beam-forming optical system, a picture display system with at least one picture display panel, a system of projection lenses, and a picture projection screen, the picture display panel being provided with the microlens array at a side which faces towards the radiation source.

12. A flat panel display device provided with an optical element manufactured by a method as claimed in claim 2 wherein the optical element is a microlens array, while the flat panel display device is provided with, in that order, an illumination system for supplying an illumination beam, a picture display panel with a defined pattern of picture display elements for modulating picture information to be displayed, the microlens array being arranged between the illumination system and the picture display panel and being provided with a pattern of optical sub-elements which corresponds to the pattern of picture display elements of the picture display panel.

13. A solid state image sensor device provided with an optical element manufactured by a method as claimed in claim 2 wherein the optical element is a microlens array and the image sensor device comprises a semiconductor body which is provided at a surface with a charge coupled device and with a pattern of image sensor elements for converting radiation into electric charges and which adjoins the microlens array at a side where the radiation is incident, while each optical sub-element of the microlens array corresponds to an image sensor element of the semiconductor body.

14. A camera provided with an optical element manufactured by a method as claimed in claim 2 wherein the optical element is a microlens array, and the camera is provided with, in that order, an objective lens system and an image sensor system with at least one solid state image sensor device which is provided with the microlens array at a side which faces the objective lens system.

* * * * *